United States Patent
Coffman et al.

(10) Patent No.: US 10,896,546 B2
(45) Date of Patent: *Jan. 19, 2021

(54) AUGMENTED REALITY SYSTEM WITH AN ACTIVE PORTABLE ANCHOR

(71) Applicant: The Boeing Company, Chicago, IL (US)

(72) Inventors: Mathew Albert Coffman, Saint Charles, MO (US); Nathan Christian Lee, Dardenne Prairie, MO (US)

(73) Assignee: The Boeing Company, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/032,194

(22) Filed: Jul. 11, 2018

(65) Prior Publication Data

US 2020/0020164 A1    Jan. 16, 2020

(51) Int. Cl.
*G06T 19/00* (2011.01)
*G01S 19/51* (2010.01)
*G01S 19/14* (2010.01)

(52) U.S. Cl.
CPC ........... *G06T 19/006* (2013.01); *G01S 19/14* (2013.01); *G01S 19/51* (2013.01)

(58) Field of Classification Search
CPC ........ G06T 19/006; G01S 19/14; G01S 19/51
See application file for complete search history.

(56) References Cited

U.S. PATENT DOCUMENTS

| | | | | |
|---|---|---|---|---|
| 9,292,180 B2 * | 3/2016 | Gass | .................. | G06Q 50/04 |
| 9,852,546 B2 * | 12/2017 | Kraver | .................. | G06T 19/006 |
| 2014/0022281 A1 * | 1/2014 | Georgeson | ........... | G06F 3/1454 |
| | | | | 345/633 |
| 2014/0118339 A1 * | 5/2014 | Davies | ................... | G06T 15/10 |
| | | | | 345/419 |
| 2017/0287218 A1 * | 10/2017 | Nuernberger | ........... | G06T 19/20 |
| 2018/0210492 A1 * | 7/2018 | Chen | ..................... | F04B 49/022 |
| 2018/0225874 A1 * | 8/2018 | Page | ...................... | G06F 1/163 |
| 2018/0249086 A1 * | 8/2018 | Ozawa | ................ | H04N 13/239 |
| 2019/0272674 A1 * | 9/2019 | Comer | ................. | G06T 19/006 |
| 2020/0020163 A1 | 1/2020 | Coffman et al. | | |

OTHER PUBLICATIONS

Georgel et al., "An Industrial Augmented Reality Solution for Discrepancy Check," 6th IEEE and ACM International Symposium on Mixed and Augmented Reality, Nov. 13-16, 2007,4 pages (Year: 2007).*

Georgel et al., "An Industrial Augmented Reality Solution for Discrepancy Check," 6th IEEE and ACM International Symposium on Mixed and Augmented Reality, Nov. 13-16, 2007, 4 pages.

Coffman et al., "Augmented Reality System with an Active Portable Anchor," U.S. Appl. No. 16/032,168, filed Jul. 11, 2018, 68 pages.

Office Action, dated Sep. 18, 2019, regarding U.S. Appl. No. 16/032,168, 32 pages.

European Patent Office Extended Search Report, dated Nov. 14, 2019, regarding Application No. 19184880.3, 8 pages.

* cited by examiner

*Primary Examiner* — Michael Le
(74) *Attorney, Agent, or Firm* — Yee & Associates, P.C.

(57) ABSTRACT

A method, apparatus, and augmented reality system comprising an active portable anchor used by an augmented reality device to display augmented reality information on a live view of an object. The active portable anchor is configured to output a current physical anchor position of the active portable anchor relative to an object.

24 Claims, 11 Drawing Sheets

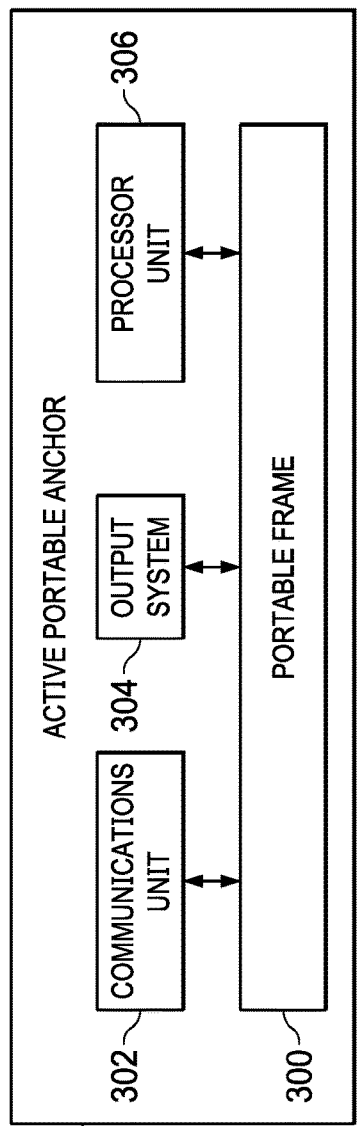
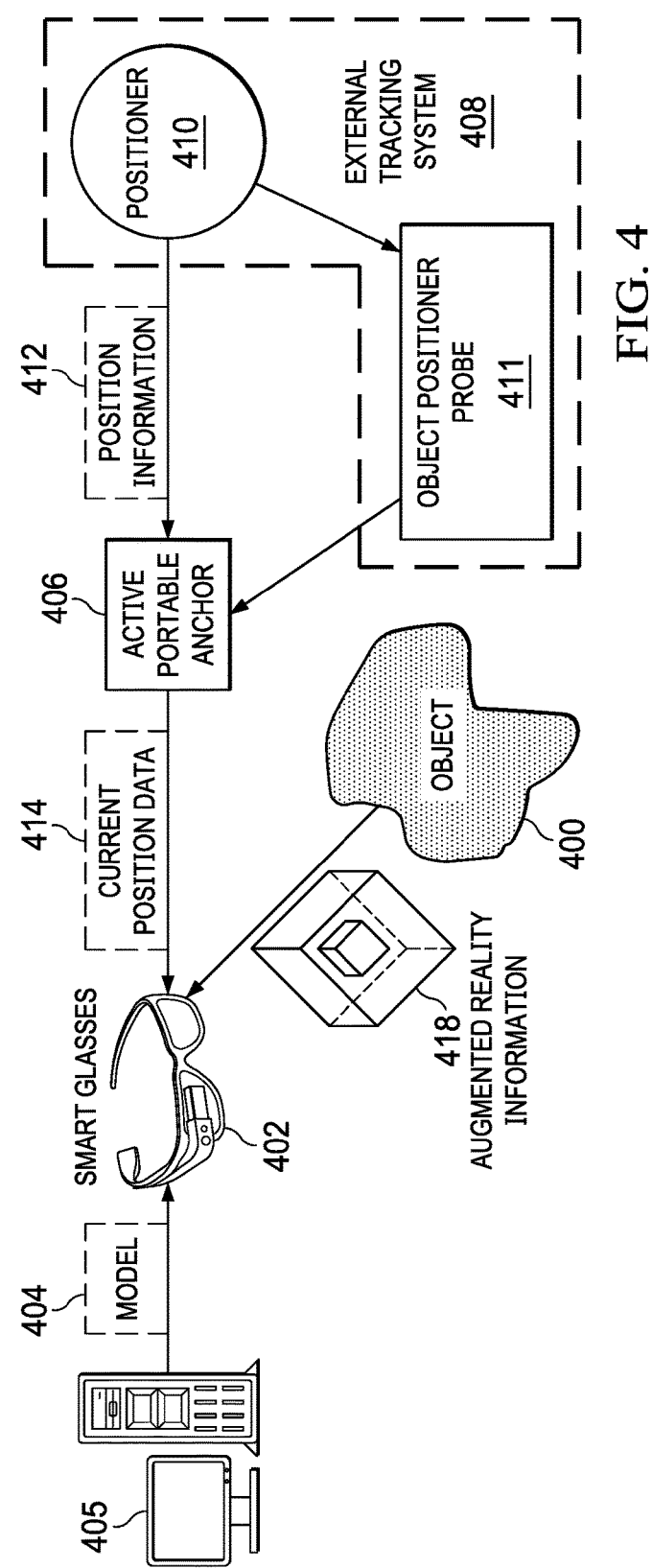

AUGMENTED REALITY SYSTEM WITH AN ACTIVE PORTABLE ANCHOR

CROSS-REFERENCE TO RELATED APPLICATION

This application is related to U.S. patent application Ser. No. 16/032,168, entitled "Augmented Reality System with an Active Portable Anchor," filed on Jul. 11, 2018, and issued as U.S. Pat. No. 10,839,604 on Nov. 17, 2020, which is incorporated herein by reference in its entirety.

BACKGROUND INFORMATION

1. Field

The present disclosure relates generally to an improved augmented reality system and, in particular, to an improved method, apparatus, and system for an augmented reality system with active anchors.

2. Background

Augmented reality involves an interactive experience with a real-world environment that is augmented by information from a computer system. The information is displayed on a live view of the real-world environment seen through an augmented reality device. The information is displayed on the live view in a manner that provides descriptions or indicators about objects in the live view to a user. This information is also referred to as augmented reality information. In other cases, the augmented reality information is displayed on the live view of the real-world environment in a manner that is seamlessly interwoven such that the information perceived as part of the real-world environment is seen through the augmented reality device.

Augmented reality devices are used in many applications in real-world environments. For example, augmented reality devices can be used in manufacturing or performing maintenance on an object such as an aircraft. Augmented reality devices are used by human operators performing operations to assemble parts, fabricate parts, inspect assemblies, or other operations. Information used to augment a live view of the aircraft may include, for example, a schematic diagram, graphical indicators identifying an inconsistency, a wiring diagram, a display of components hidden under skin panels, or other types of information.

Anchors are used to describe the position of an object in the real-world environment. An anchor is also referred to as a spatial anchor and marks a position with respect to the object in the real-world environment. The anchor can be correlated to a corresponding position in a model of the object.

Displaying augmented reality information such as graphics or holograms on a live view of an object can be more accurate using the coordinate system of an anchor. These anchors can be used by the augmented reality device to orient itself. In other words, the anchors can be used by the augmented reality device to identify the position of the augmented reality device for use in displaying the augmented reality information on the live view of the object.

Currently, anchors are permanent in the real-world environment. In other words, an anchor is fixed for use in displaying augmented reality information. For example, anchor plates are a type of physical anchor and are formed or installed on an object such as a room or pipes in the room. The positions of these anchor plates are correlated to their respective positions in the model of the object to provide the augmented reality device with a reference for itself to display augmented reality information with a desired level of accuracy on the live view of object.

One drawback with using these anchors is the limited distance from which an augmented reality device can be located with respect to accuracy. As the distance of the augmented reality device from the anchor increases, the accuracy with which an augmented reality device in displaying augmented reality information on the live view of the object decreases.

For example, a distance of more than five meters from may result in an undesired level of accuracy for the augmented reality device to display the augmented reality information in positions on or proximate to the object. As a result, the number of anchors needed for desired accuracy may be greater than possible or feasible for some objects. Further, programming anchors into a model for an augmented reality system is time-consuming.

Therefore, it would be desirable to have a method and apparatus that take into account at least some of the issues discussed above, as well as other possible issues. For example, it would be desirable to have a method and apparatus that overcome a technical problem with orienting an augmented reality device to an object in a real-world environment.

SUMMARY

In an illustrative embodiment, an apparatus comprises an active portable anchor used by an augmented reality device to display augmented reality information on a live view of an object. The active portable anchor is configured to output a current physical anchor position of the active portable anchor relative to the object.

In another illustrative embodiment, an augmented reality system comprises an augmented reality device configured to receive a current physical anchor position of an active portable anchor relative to an object from the active portable anchor. The augmented reality device is also configured to determine a current model anchor position of the active portable anchor in a model of the object using the current physical anchor position of the active portable anchor relative to the object. The augmented reality device is configured to display augmented reality information on a live view of the object in the augmented reality device using the current model anchor position of the active portable anchor and the model of the object. Accuracy in positioning the augmented reality information on the live view of the object is increased with updating the current model anchor position of the active portable anchor in the model of the object to reflect the current physical anchor position of the active portable anchor relative to a physical object position of the object.

In another illustrative embodiment, a method is present for displaying augmented reality information on an augmented reality device. The augmented reality device receives a current physical anchor position of an active portable anchor relative to an object from the active portable anchor. A current model anchor position of the active portable anchor in a model of the object is determined using the current physical anchor position of the active portable anchor relative to the object. The augmented reality information is displayed in a live view of the object in the augmented reality device using the current model anchor position of the active portable anchor and the model of the object. Accuracy in positioning the augmented reality information on the live view of the object is increased with dynamically updating the current model anchor position of the active portable anchor in the model of the object to reflect the current physical anchor position of the active portable anchor relative to a physical object position of the object.

In yet another illustrative embodiment, a method is present for orienting an augmented reality device. A current physical anchor position of an active portable anchor is identified. The active portable anchor is used by the augmented reality device to display augmented reality information on a live view of an object. The current physical anchor position of the active portable anchor relative to the object is output.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 3 is an illustration of a block diagram of an active portable anchor in accordance with an illustrative embodiment;

FIG. 4 is an illustration of a dataflow diagram for displaying augmented reality information on a live view of an object in accordance with an illustrative embodiment;

DETAILED DESCRIPTION

Figure 1:
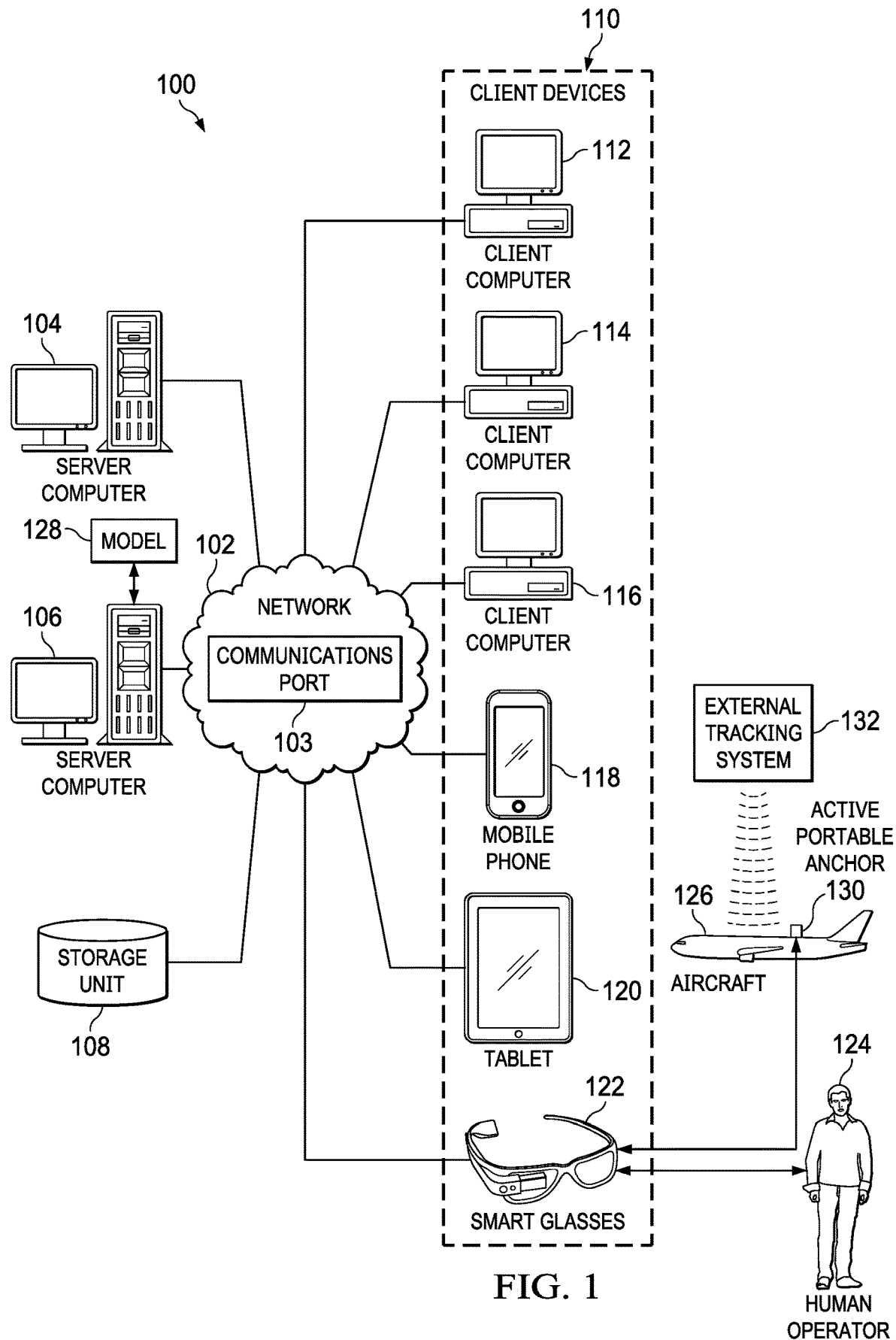
FIG. 1 is a pictorial representation of a network of data processing systems in which illustrative embodiments may be implemented.

The illustrative embodiments recognize and take into account one or more different considerations. The illustrative embodiments recognize and take into account that accuracy in positioning augmented reality information displayed on a live view of an aircraft is important in performing operations on the aircraft. For example, the augmented reality information can be displayed on the live view to perform operations such as drilling holes, reworking an inconsistency, applying a sealant, or installing fasteners in the aircraft. In one illustrative example, the augmented reality information can show inconsistencies using visual information tags. These tags can mark the location of the inconsistencies and provide information about the inconsistencies.

The illustrative embodiments recognize and take into account that, in a dynamic environment, the use of permanent anchors is currently infeasible. Further, the illustrative embodiments recognize and take into account that techniques for programming anchors into a model for use by an augmented reality device is time-consuming. The illustrative embodiments recognize and take into account that the amount of set-up time for currently used anchors is much greater than desired.

The illustrative embodiments recognize and take into account that currently available techniques for calibrating or orienting an augmented reality device do not work well in a dynamic environment in which at least one of objects or human operators with augmented reality devices move. For example, the illustrative embodiments recognize and take into account that using fixed point or dynamic photogrammetry is taxing in resource use in augmented reality systems and requires much effort to program in features such as anchor plates on the object into the model of the object.

Further, the illustrative embodiments recognize and take into account that, with aircraft, the number of features that are usable for this type of process are few enough to be infeasible. Additionally, the illustrative embodiments recognize and take into account that the computer-aided design data would be much greater than desired without a desired resolution. The illustrative embodiments recognize and take into account that this type of technique is more suitable for smaller volumes or spaces as compared to those for an aircraft.

The illustrative embodiments also recognize and take into account that currently used anchor plates are not very useful because they are required to be in known positions. This type of limitation makes anchor plates infeasible for use in dynamic environments in which human operators may move with respect to the aircraft.

The illustrative embodiments recognize and take into account that active portable anchors can enable augmented reality devices to quickly orient themselves to the object in an environment. The illustrative embodiments recognize and take into account that active portable anchors can be used as a calibration plate similar to current anchors, allowing an augmented reality device to recognize that an anchor is present in the real-world environment. The illustrative embodiments also recognize and take into account that an active portable anchor can also be configured to provide an augmented reality device the current position of the active portable anchor relative to the object.

The illustrative embodiments recognize and take into account that this type of solution can be implemented by utilizing a secondary location system in the form of an external tracking system. The illustrative embodiments recognize and take into account that the external tracking system operates to identify the position of the active portable anchors and relay that information through those active portable anchors, which in turn provide the information to augmented reality devices.

Thus, the illustrative embodiments provide a method, an apparatus, and a system for providing an augmented reality device an ability to locate itself within an environment using active anchors that are portable. In one illustrative example, an augmented reality system comprises an active portable anchor, a processor system, and an augmented reality device. The active portable anchor is configured to output a current physical anchor position of the active portable anchor relative to an object. The processor system is configured to determine the current physical anchor position of the active portable anchor relative to the object using a physical anchor position of the active portable anchor and a physical object position of the object.

The augmented reality device is configured to receive the current physical anchor position of the active portable anchor relative to the object from the active portable anchor. The augmented reality device is also configured to determine a current model position of the active portable anchor in a model of the object using the current physical anchor position and display augmented reality information in association on a live view of the object in the augmented reality device using the current model anchor position of the active portable anchor and the model of the object. The model anchor position of the active portable anchor in the model of the object is dynamically updated to reflect the current physical anchor position of the active portable anchor relative to the object.

The position of an object includes the location of the object described in three dimensions. For example, the location can be described using a Cartesian coordinate system. Further, the position of the object also includes an orientation of the object. The orientation can be describe using two or more vectors in the illustrative example.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 may be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, some or all of client devices 110 may form an Internet of things (IOT) in which these physical devices can connect and exchange data.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 may be stored on a computer recordable storage medium and downloaded to a data processing system or other device for use. For example, program code may be stored on a computer recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 may be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

In one illustrative example, human operator 124 operates an augmented reality device, such as smart glasses 122, to perform at least one of manufacturing or maintenance operations on aircraft 126. As depicted, server computer 106 sends model 128 of aircraft 126 to smart glasses 122 for use in displaying augmented reality information to augment a live view of aircraft 126 for human operator 124.

In this depicted example, active portable anchor 130 and external tracking system 132 provide information utilized to identify the position of smart glasses 122 relative to aircraft 126. External tracking system 132 identifies the physical position of aircraft 126 and active portable anchor 130. A processor system located in at least one of active portable anchor 130, external tracking system 132, client devices 110, server computer 104, or server computer 106 identifies the current physical anchor position of active portable anchor 130 relative to aircraft 126. Active portable anchor 130 sends this current physical anchor position to smart glasses 122.

As depicted, smart glasses 122 receives the current physical position of active portable anchor 130 from active portable anchor 130. This current physical anchor position of active portable anchor 130 can be received by smart glasses 122 in a number of different ways. For example, the current physical anchor position can be received from at least one of a display of the current physical anchor position on active portable anchor 130 or a wireless transmission of the current physical position from active portable anchor 130.

The current physical anchor position of active portable anchor 130 is used by smart glasses 122 to determine where to display augmented reality information on a live view of aircraft 126. For example, augmented reality information may be wiring for aircraft 126 located below the surface of aircraft 126. With the current physical position, smart glasses 122 determines where to display graphics in the live view of aircraft 126 to show the wiring in the actual location of the wiring in aircraft 126.

Smart glasses 122 determines its position relative to active portable anchor 130. Upon calibrating itself to active portable anchor 130, smart glasses 122 can process model 128 of aircraft 126 to display augmented reality information without user input and without using photogrammetry data of a larger model.

With respect to accuracy, active portable anchor 130 can be moved as human operator 124 moves to maintain a distance between smart glasses 122 and active portable anchor 130 such that a desired accuracy is maintained in displaying augmented reality information in positions on the live view of aircraft 126. When active portable anchor 130 is moved, a new physical anchor position of active portable anchor 130 can be dynamically determined and provided to smart glasses 122.

The illustration of network data processing system 100 in the components for the augmented reality system is not meant to limit the manner in which network data processing system 100 can implement it. In other illustrative examples, one or more intelligent global positioning locators may be present in addition to the ones depicted. Further, one or more users with augmented reality devices in addition to human operator 124 may be present performing operations on aircraft 126.

In one illustrative example, network 102 includes communications port 103. Communications port 103 is a hardware port in network 102 that is configured to provide for communications with other data processing systems or devices, such as active portable anchor 130. The communications can be direct or indirect with one or more other devices facilitating the sending or receiving of communications. In these illustrative examples, communications port 103 is located in a network interface card, a switch, a router, or some other device.

As depicted, communications port 103 is configured to communicate with active portable anchor 130 and send a current physical anchor position of active portable anchor 130 relative to an object, such as aircraft 126, to active portable anchor 130 in which the current physical anchor position of active portable anchor 130 relative to the object is determined using a physical anchor position of active portable anchor 130 and a physical object position of the object. Active portable anchor 130 is configured to output the current physical anchor position of active portable anchor 130 relative to an object, such as aircraft 126.

Further, an augmented reality device, such as smart glasses 122, is configured to receive the current physical anchor position of active portable anchor 130 relative to the object from active portable anchor 130. Smart glasses 122 are configured to determine a current model anchor position of active portable anchor 130 in model 128 of the object using the current physical anchor position and display augmented reality information in association on a live view of the object in the augmented reality device using the current model anchor position of active portable anchor 130 and model 128 of the object. The current model anchor position of active portable anchor 130 in model 128 of the object is dynamically updated to reflect the current physical anchor position of active portable anchor 130 relative to the object.

Thus, a technical problem with orienting an augmented reality device to an object in a real-world environment can be overcome in network data processing system 100. One or more technical solutions may provide a technical effect of enabling an augmented reality device, such as smart glasses 122, to orient itself with an anchor, such as active portable anchor 130. In one or more technical solutions, active portable anchor 130 can be moved to different locations relative to an object, such as aircraft 126, enabling maintaining a desired distance between smart glasses 122 and active portable anchor 130, which results in maintaining a desired level of accuracy in displaying augmented reality information on a live view in smart glasses 122. As a result, one or more of the technical solutions using active portable anchor 130 enables human operator 124 to perform operations on aircraft 126 with a desired level of accuracy when relying on the display of augmented reality information on a live view in smart glasses 122. For example, when the operation is a manufacturing operation such as drilling a hole, the locations of holes can be indicated in augmented reality information on the live view of aircraft 126 with a desired level of accuracy for drilling the hole.

Figure 2:
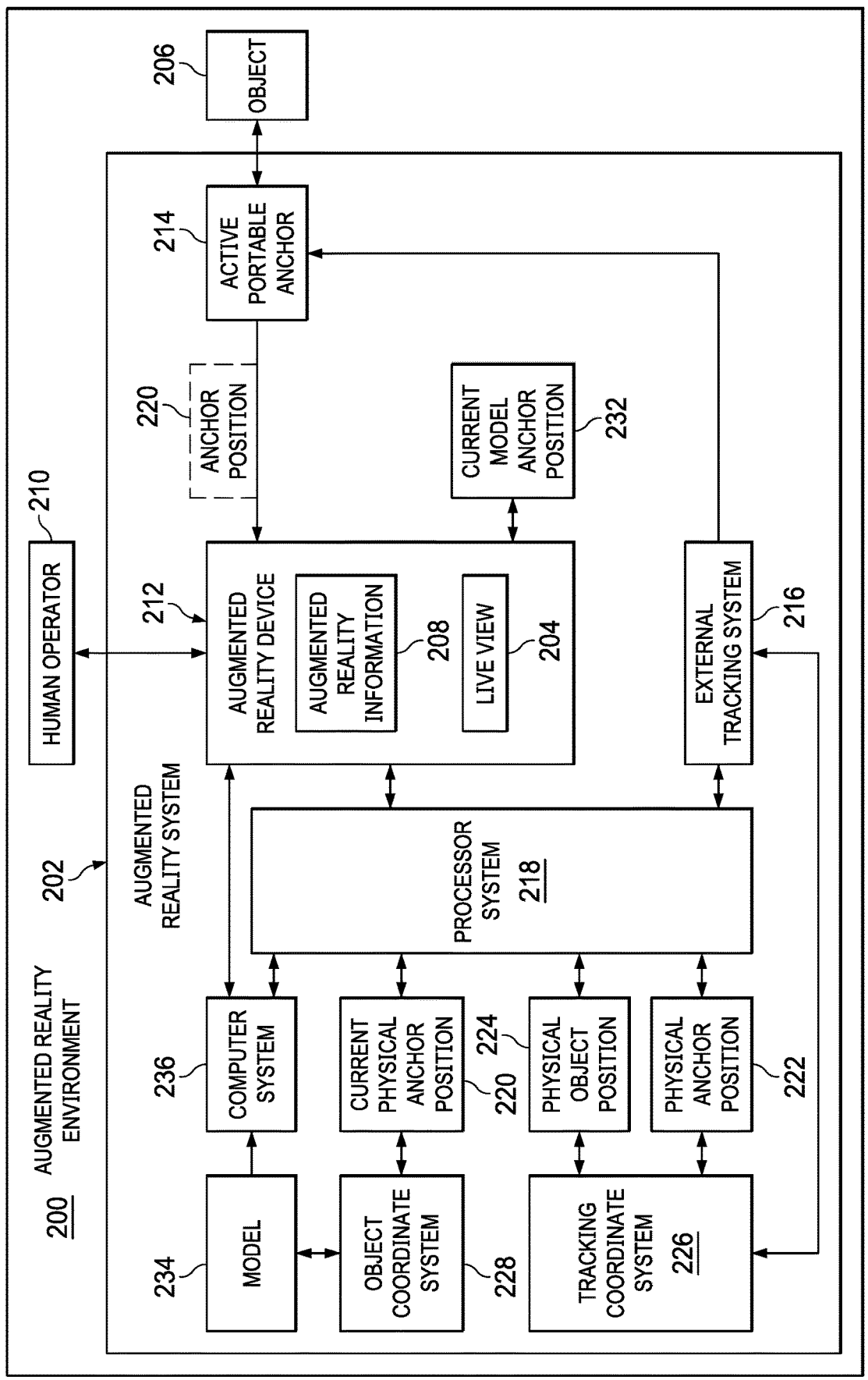
FIG. 2 is an illustration of a block diagram of an augmented reality environment in accordance with an illustrative embodiment.

Turning next to FIG. 2, an illustration of a block diagram of an augmented reality environment is depicted in accordance with an illustrative embodiment. In this illustrative example, the different components shown in block form in augmented reality environment 200 can be implemented using components shown in network data processing system 100 in FIG. 1.

Augmented reality environment 200 is an environment in which augmented reality system 202 is configured to augment live view 204 of object 206 with augmented reality information 208 seen by human operator 210 utilizing augmented reality device 212. Object 206 may take a number of different forms. For example, object 206 can be aircraft 126 in FIG. 1. Further, object 206 also can be selected from a mobile platform, a stationary platform, a land-based structure, an aquatic-based structure, a space-based structure, a commercial aircraft, a rotorcraft, a surface ship, a tank, a personnel carrier, a train, a spacecraft, a space station, a satellite, a submarine, an automobile, a power plant, a bridge, a dam, a house, a manufacturing facility, a building, a fuselage, an engine, a wing, a skin panel, a landing gear assembly, a monument, and other suitable objects.

In this illustrative example, augmented reality device 212 is a physical hardware device and is selected from one of a head-mounted display, an optical see-through head-mounted display, a mobile phone, a tablet computer, smart glasses, wearable computer glasses, or some other suitable hardware system that can be moved and held or worn by human operator 210.

As depicted, live view 204 may be provided by augmented reality device 212 as a video feed on a display or by using transparent, see-through displays or lenses, such that the user is able to see the physical real-world environment through the display in augmented reality device 212.

For example, live view 204 can be seen on a display for augmented reality device 212 in the form of a head-mounted display, smart glasses, or a tablet computer. Augmented reality information 208 can be superimposed on the display in this type of augmented reality device 212. In other illustrative examples, live view 204 may be provided indirectly to a display in which other information is displayed on live view 204. Live view 204 can be provided using a camera system that displays images or video on a display device in augmented reality device 212.

In another illustrative example, live view 204 may be seen directly by human operator 210 of augmented reality device 212 with augmented reality information 208 being displayed over what the user sees on live view 204. When live view 204 is seen directly by the user, the detection of live view 204 can be performed by using a sensor system, such as a camera system for augmented reality device 212.

As depicted, augmented reality information 208 augments live view 204 and can take a number of different forms. For example, augmented reality information 208 may be selected from at least one of a schematic diagram, a user input window, an instruction, a graphic for a hidden structure, or holograms for components below the surface of object 206 that are invisible on live view 204 of object 206. The components may be, for example, selected from at least one of wiring, a pipe, composite layers, an inconsistency, a joint, a line replaceable unit, or other components that may be in object 206.

In another illustrative example, augmented reality information 208 may include a graphical indicator drawing attention to a portion of object 206. For example, the graphical indicator may draw attention to an inconsistency such as a delamination, a crack, worn paint, an incorrect dimension, or other types of inconsistencies.

As another example, the graphical indicator may draw attention to the location in which an operation is to be performed. This operation may be, for example, a drilling operation, a fastener installation operation, an inspection operation, or some other suitable type of operation that may be used for manufacturing or maintenance of object 206.

Further, augmented reality information 208 also may prompt human operator 210 to provide user input to verify that a change should be made to resolve an inconsistency in object 206. In still another illustrative example, augmented reality information 208 can provide a visualization of user input made by human operator 210. For example, augmented reality information 208 may include graphical indicators that show locations where human operator 210 or another human operator has "marked" inconsistences on object 206.

As depicted, augmented reality system 202 includes a number of different components. In this example, augmented reality system 202 comprises active portable anchor 214, external tracking system 216, processor system 218, and augmented reality device 212.

Active portable anchor 214 is configured to output current physical anchor position 220 of active portable anchor 214 relative to physical object position 224 of object 206.

As depicted, processor system 218 is a physical hardware system that includes one or more processor units. When more than one processor unit is present, those processor units may communicate with each other using a communications medium. When the processor units are located in the same data processing system, the communications medium may be a bus or busses in the data processing system. When the processor units are located in different data processing systems, the communications medium may be the bus or busses and a network. The processor system can be selected from at least one of a central processing unit (CPU), a graphics processing unit (GPU), a multicore processor, a physics processing unit (PPU), a digital signal processor (DSP), a network processor, or some other suitable type of processor.

In this illustrative example, processor system 218 can be located in one or more different locations. For example, processor system 218 can be located in at least one of active portable anchor 214, external tracking system 216, or in some other data processing system in augmented reality environment 200.

As depicted, processor system 218 is configured to determine current physical anchor position 220 of active portable anchor 214 relative to object 206 using physical anchor position 222 of active portable anchor 214 and physical object position 224 of object 206.

In this illustrative example, external tracking system 216 is a physical hardware system. External tracking system 216 includes at least one of a laser tracker, a laser scanner, a camera, a displacement sensor, a measurement sensor, a probe, or some other type of external tracking system.

External tracking system 216 is configured to determine physical anchor position 222 of active portable anchor 214 and physical object position 224 of object 206. Physical anchor position 222 and physical object position 224 are described using tracking coordinate system 226 for external tracking system 216.

In this depicted example, physical object position 224 can be placed into object coordinate system 228 for object 206. A part of object 206 can be designated as a reference point or origin.

For example, if object 206 is an aircraft, the origin can be the nose tip of the aircraft. Physical anchor position 222 can be converted or correlated to object coordinate system 228. Object coordinate system 228 is the coordinate system used in model 234 of object 206.

The correlation is made such that physical anchor position 222 in tracking coordinate system 226 is converted to current physical anchor position 220 in object coordinate system 228 in which current physical anchor position 220 of active portable anchor 214 is relative to object 206. In other words, current physical anchor position 220 is relative to a reference point such as an origin for object 206 in object coordinate system 228.

In other words, physical anchor position 222 and physical object position 224 in tracking coordinate system 226 are correlated by being converted or transformed to use object coordinate system 228 in model 234 of object 206. This conversion or transformation can be made when the same reference points are used for the origin of object 206. For example, when object 206 is an aircraft, this origin can be determined, for example, by using three or more reference points. The origin can be, for example, a nose tip, a wingtip, a window, or some other feature on or within the aircraft.

As depicted, augmented reality device 212 is configured to receive current physical anchor position 220 of active portable anchor 214 relative to object 206 from active portable anchor 214. Augmented reality device 212 is configured to determine current model anchor position 232 of active portable anchor 214 using current physical anchor position 220 in model 234 of object 206. For example, augmented reality device 212 determines current model anchor position 232 of active portable anchor 214 in model 234 of object 206 that correlates to current physical anchor position 220 of active portable anchor 214 relative to object 206 received from active portable anchor 214.

In this illustrative example, model 234 of object 206 can take a number of different forms. For example, model 234 can be a partial model of object 206 that contains a portion of object 206 or can contain all of object 206. For example, when object 206 is an aircraft, model 234 can be a wing of the aircraft or the entire aircraft. In one illustrative example, the partial model of object 206 is selected from at least one of the portion of object 206 in a field of view of augmented reality device 212 or the portion of object 206 within a selected distance of augmented reality device 212.

In still another illustrative example, model 234 of object 206 may be selected from one of a plurality of partial models that are based on dividing object 206 into regions based on various criteria. The criteria may include, for example, at least one of, a type of operation to be performed on object 206, size limitations for the partial models, storage space available in augmented reality device 212 for a partial model, and other suitable types of criteria.

Augmented reality device 212 is configured to display augmented reality information 208 in association on live view 204 of object 206 in augmented reality device 212 using current model anchor position 232 of active portable anchor 214 and model 234 of object 206. As a result, current model anchor position 232 of active portable anchor 214 in model 234 of object 206 is dynamically updated to reflect current physical anchor position 220 of active portable anchor 214 relative to object 206.

In this illustrative example, computer system 236 is in communication with augmented reality device 212. Computer system 236 sends model 234 of object 206 to augmented reality device 212 in this illustrative example. Computer system 236 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

In one illustrative example, one or more technical solutions are present that overcome a technical problem with orienting an augmented reality device to an object in a real-world environment. As a result, one or more technical solutions may provide a technical effect of enabling an augmented reality device to orient itself with an anchor. One or more technical solutions provide an active portable anchor in which this anchor can be moved to different locations enabling maintaining a desired distance between augmented reality device 212 and active portable anchor 214, which results in maintaining a desired level of accuracy in displaying augmented reality information 208 on live view 204.

As a result, augmented reality system 202 operates as a special purpose computer system in which active portable anchor 214 in augmented reality system 202 enables augmented reality device 212 to display augmented reality information 208 on live view 204 of object 206 with increased accuracy. For example, active portable anchor 214 is a physical component that transforms augmented reality system 202 into a special purpose computer system as compared to currently available general computer systems that do not have active portable anchor 214.

Turning next to FIG. 3, an illustration of a block diagram of an active portable anchor is depicted in accordance with an illustrative embodiment. In the illustrative examples, the same reference numeral may be used in more than one figure. This reuse of a reference numeral in different figures represents the same element in the different figures.

This figure depicts one manner in which active portable anchor 214 can be implemented. In this example, active portable anchor 214 comprises portable frame 300, communications unit 302, output system 304, and processor unit 306. In this example, these components enable active portable anchor 214 to be used by an augmented reality device to display augmented reality information on a live view of an object. These components operate to enable active portable anchor 214 to output a current physical anchor position of active portable anchor 214 relative to an object.

As depicted, portable frame 300 is a structure that operates to support, enclose, or hold components for active portable anchor 214. At least one of dimensions or weight of portable frame 300 is selected such that portable frame 300 can be moved by a human operator. In some cases, the dimensions or weight can be selected such that two human operators may move portable frame 300.

Portable frame 300 can take a number of different forms. For example, portable frame 300 can be a housing, an enclosure, a platform, or some other suitable structure. In this example, communications unit 302, output system 304, and processor unit 306 can be physically connected to portable frame 300.

As used herein, a first component "physically connected to" a second component means that the first component can be connected directly or indirectly to the second component. In other words, additional components may be present between the first component and the second component. The first component is considered to be indirectly connected to the second component when one or more additional components are present between the two components. When the first component is directly connected to the second component, no additional components are present between the two components.

As depicted, communications unit 302 can be implemented using Wi-Fi, Bluetooth, or some other wireless transmission technology using radio frequency waves, optical signals, or other types of wireless transmission media. For example, "Wi-Fi" is a trademark of the Wi-Fi alliance, and "Bluetooth" is a registered trademark of Bluetooth SIG, Inc.

In this illustrative example, communications unit 302 is configured to receive physical anchor position 222 of active portable anchor 214 and physical object position 224 of object 206 as determined by external tracking system 216. This position information can be received using a wireless communications link established by communications unit 302.

Output system 304 is physically connected to portable frame 300. The output from output system 304 and active portable anchor 214 can be made using at least one of a wireless transmitter or a display device.

In this example, processor unit 306 is physically connected to portable frame 300 and in communication with communications unit 302 and output system 304. Processor unit 306 is configured to determine the current physical anchor position of the active portable anchor relative to a physical object position of an object using the physical anchor position and the physical object position; and output the current physical anchor position of the active portable anchor relative to the physical object position of the object using the output system.

The illustration of augmented reality environment 200 and the different components in FIG. 2 and FIG. 3 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Turning next to FIG. 4, an illustration of a dataflow diagram for displaying augmented reality information on a live view of an object is depicted in accordance with an illustrative embodiment. As depicted, data flow for displaying augmented reality information on a live view of object 400 is depicted in accordance with an illustrative embodiment. In this illustrative example, smart glasses 402 are example of an implementation for augmented reality device 212 in FIG. 2. Smart glasses 402 receives model 404 of object 400 from computer 405. Model 404 is used by smart glasses 402 to display augmented reality information on the live view of object 400. As depicted, graphics, information, and other data from model 404 can be used to create augmented reality information or be displayed as augmented reality information.

In positioning augmented reality information 418 on the live view of object 400, smart glasses 402 orients itself with respect to active portable anchor 406. In this example, the orientation is performed by recognizing active portable anchor 406 as a reference for use in identifying the position of smart glasses 402 and correlating model 404 of object 400 with the live view of object 400. This recognition can be made when active portable anchor 406 is in the field of view of smart glasses 402.

Smart glasses 402 use photogrammetry sensors and processes to identify active portable anchor 406. This identification can be based on at least one of shape, dimensions, or other visual characteristics of active portable anchor 406. In this illustrative example, active portable anchor 406 also provides its position to smart glasses 402. The position of active portable anchor 406 is received from active portable anchor 406 in current position data 414 and used to display augmented reality information 418 on the live view of active portable anchor 406.

In this illustrative example, active portable anchor 406 is moveable during the operation of smart glasses 402. The current position of active portable anchor 406 can be determined dynamically using external tracking system 408.

In this illustrative example, external tracking system 408 includes positioner 410 and object positioner probe 411. Object positioner probe 411 may be manipulated by at least one of a human user or a robot to touch different points on object 400. Positioner 410 records measurements based on object positioner probe 411 touching object 400. Object positioner probe 411 also can be used make measurements of active portable anchor 406. These measurements may be used to identify a physical anchor position for active portable anchor 406 and a physical object position for object 400 that form position information 412.

Position information 412 is sent to active portable anchor 406. Active portable anchor 406 generates current position data 414 using position information 412. Current position data 414 includes a current physical anchor position of active portable anchor 406 relative to object 400. Active portable anchor 406 sends current position data 414 to smart glasses 402.

As depicted, smart glasses 402 identify the current physical anchor position of active portable anchor 406 relative to object 400 in current position data 414. The position of active portable anchor 406 in model 404 is updated such that the current model anchor position for active portable anchor 406 corresponds to the current physical anchor position for active portable anchor 406 relative to object 400.

Smart glasses 402 orients itself with respect to object 400 using active portable anchor 406. With this orientation, smart glasses 402 identify the position of smart glasses 402 relative to active portable anchor 406.

Smart glasses 402 display augmented reality information 418 on the live view of object 400. The positioning of augmented reality information 418 on the live view can be performed with greater accuracy when active portable anchor 406 is within a desired distance of smart glasses 402. If smart glasses 402 move, active portable anchor 406 can also be moved.

If active portable anchor 406 is moved, updates to the position in model 404 can be performed dynamically using external tracking system 408 to identify the position of active portable anchor 406 and send updated position information to active portable anchor 406.

Figure 5:
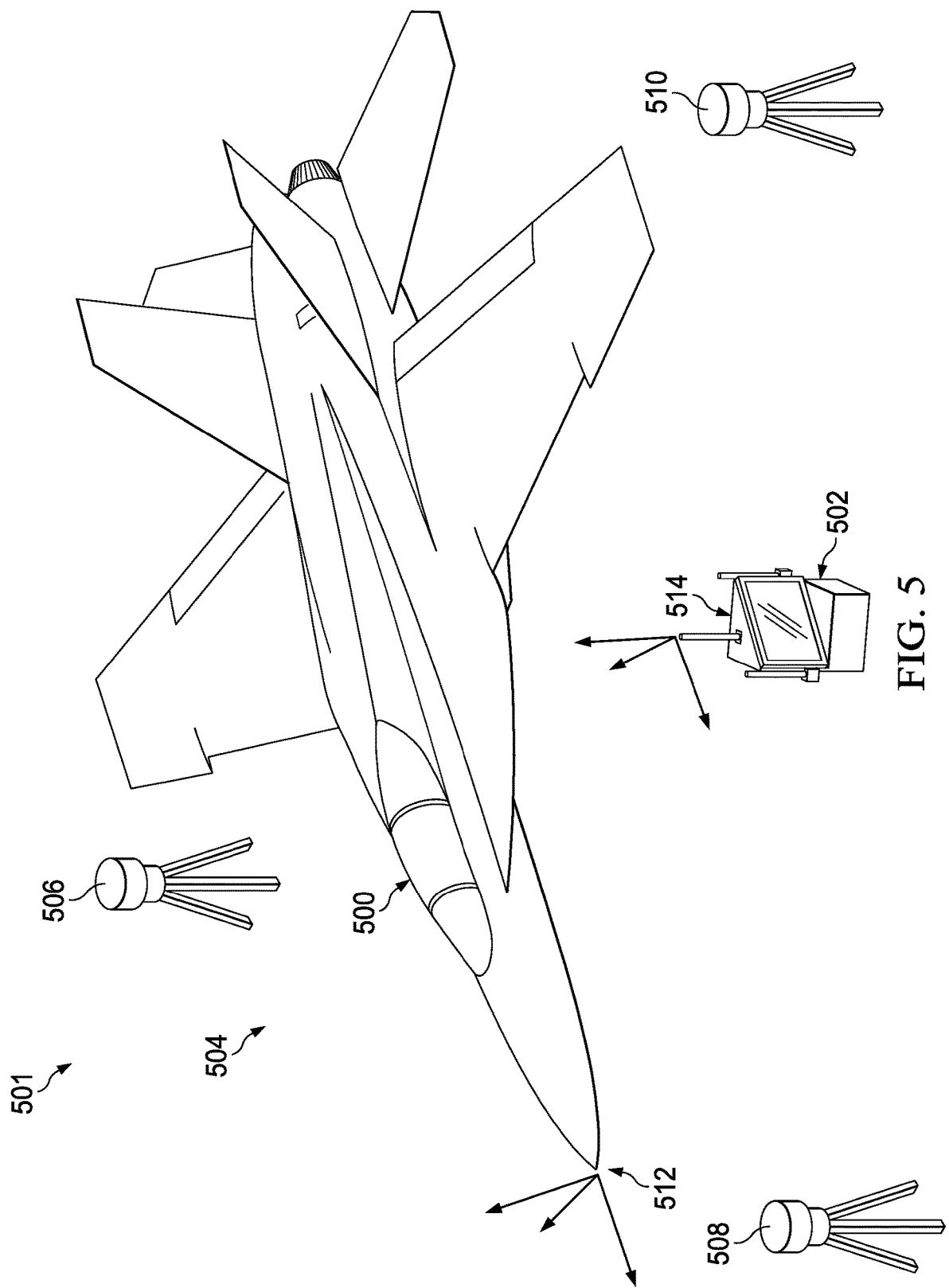
FIG. 5 is an illustration of an augmented reality environment in accordance with an illustrative embodiment.

With reference to FIG. 5, an illustration of an augmented reality environment is depicted in accordance with an illustrative embodiment. Augmented reality environment 501 is an example of one implementation for augmented reality environment 200 shown in block form in FIG. 2.

In this illustrative example, aircraft 500 is an example of object 206 in FIG. 2. Further, active portable anchor 502 is positioned relative to aircraft 500. As depicted, external tracking system 504 identifies the position of aircraft 500 and active portable anchor 502. External tracking system 504 comprises intelligent global positioning system (iGPS) locator 506, intelligent global positioning system (iGPS) locator 508, and intelligent global positioning system (iGPS) locator 510.

These intelligent global positioning system locators include laser transmitters that scan a volume of space encompassing aircraft 500 and active portable anchor 502 from different locations to identify positions of these two objects. The positions include locations and orientations based on the coordinate system for external tracking system 504.

In this depicted example, nose tip 512 of aircraft 500 is selected as a reference point for aircraft 500. As depicted, nose tip 512 has a position that includes location L1(100, 200,50) and an orientation described as X-Vector X1(0.7, 0.7,0.14) and Z-Vector Z1(−0.19, 0.28, 0.98). Top 514 of active portable anchor 502 is selected as a reference point for active portable anchor 502 and has a position that includes location L2(60,80,10) and an orientation described as X-Vector X2(0.44,−0.88,0.15) and Z-Vector Z2(0.1, −0.1, 0.99).

The location of active portable anchor 502 relative to aircraft 500 can be identified by subtracting the position of nose tip 512 from the position of top 514. The relative location is identified as L2−L1=relative location RL(40,120, 40). The relative orientation RL(X'Z') is X'=X2−X2=(0.26, 1.58,−0.01) and Z'=Z2−Z1=(−0.29,0.38,−0.01)

Subtracting these positions provides a relative location in three dimensions and a relative orientation for active portable anchor 502 that is relative to aircraft 500. This position of active portable anchor 502 can be used to update the model anchor position for active portable anchor 502 in a model of aircraft 500.

In this depicted example, the nose tip in the model corresponding to nose tip 512 is at the origin for the model of the aircraft having a location LM(0,0,0) with an orientation of XM=X−Vector (1,0,0) and ZM=Z−Vector (0,0,1). In this example, the current model anchor position in the model can be updated to reflect the position of the active portable anchor in the real-world environment. For example, the anchor location (AL) in the model is LM(0,0,0)+RL(40,120, 40)=AL(40,120,40) and the anchor orientation (AO) is AO(X',Z'), wherein XA=(1,0,0)+(0.26,1.58,−0.01)=(1.26, 1.58,−0.01) and ZA=(0,0,1)+(−0.29,0.38,−0.01)=(−0.29, 0.38,0.99).

Figure 6:
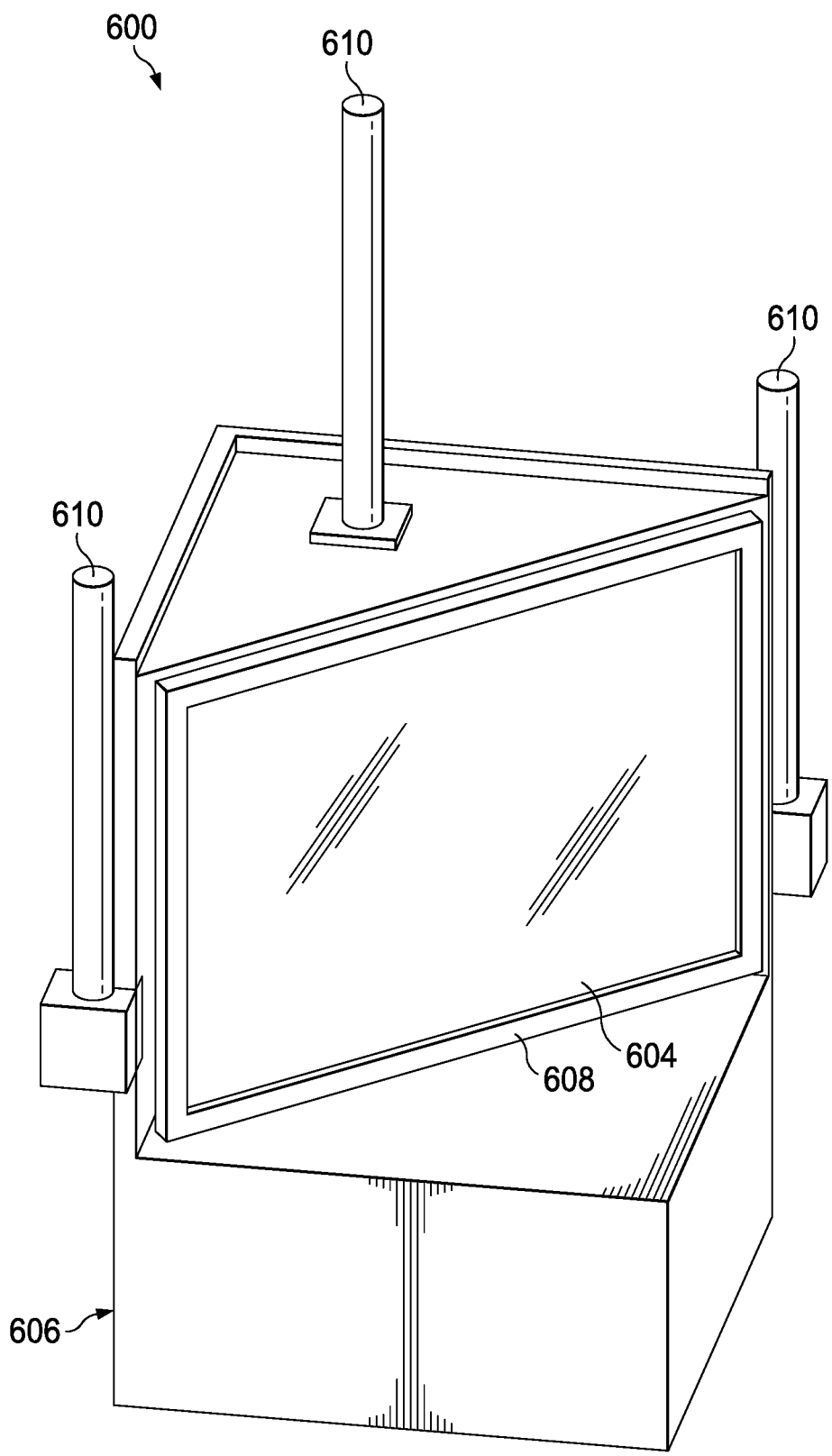
FIG. 6 is an illustration of an active portable anchor in accordance with an illustrative embodiment.

With reference next to FIG. 6, an illustration of an active portable anchor is depicted in accordance with an illustrative embodiment. In this illustrative example, active portable anchor 600 is an example of one implementation for active portable anchor 214 shown in block form in FIG. 2 and FIG. 3.

As depicted, active portable anchor 600 has portable frame 606. Flat plate 608 is physically connected to portable frame 606. Flat plate 608 has a shape that an augmented reality device will recognize as an anchor for use in orienting itself.

Display device 604 is physically connected to flat plate 608 and provides an ability to display the position of active portable anchor 600. Display device 604 can display, for example, a barcode, a matrix barcode, or some other suitable type of format that visually conveys the position of active portable anchor 600. Antennas 610 are configured to receive position information from an external tracking system.

Figure 7:
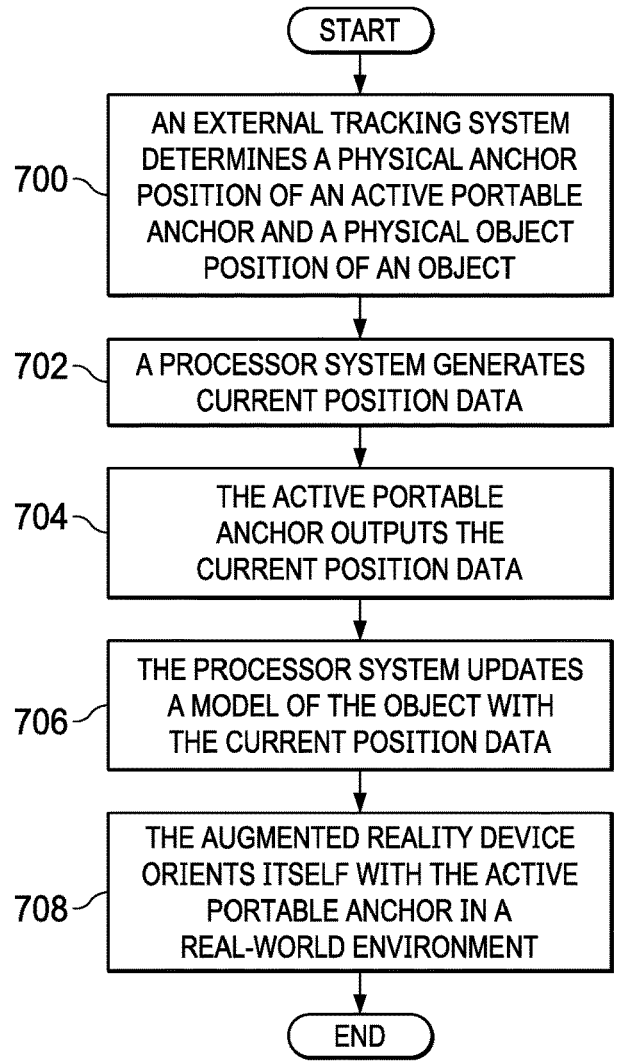
FIG. 7 is an illustration of a flowchart of a process for displaying augmented reality information on a live view in accordance with an illustrative embodiment.
Figure 8:
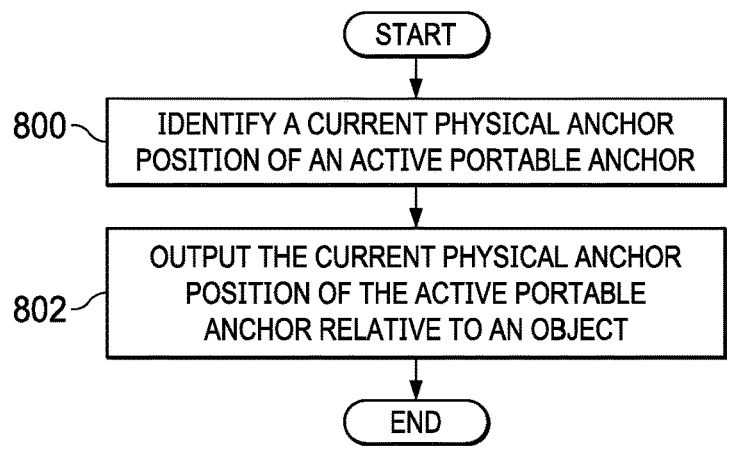
FIG. 8 is an illustration of a flowchart of a process for outputting a current physical anchor position to orient an augmented reality device in accordance with an illustrative embodiment.
Figure 9:
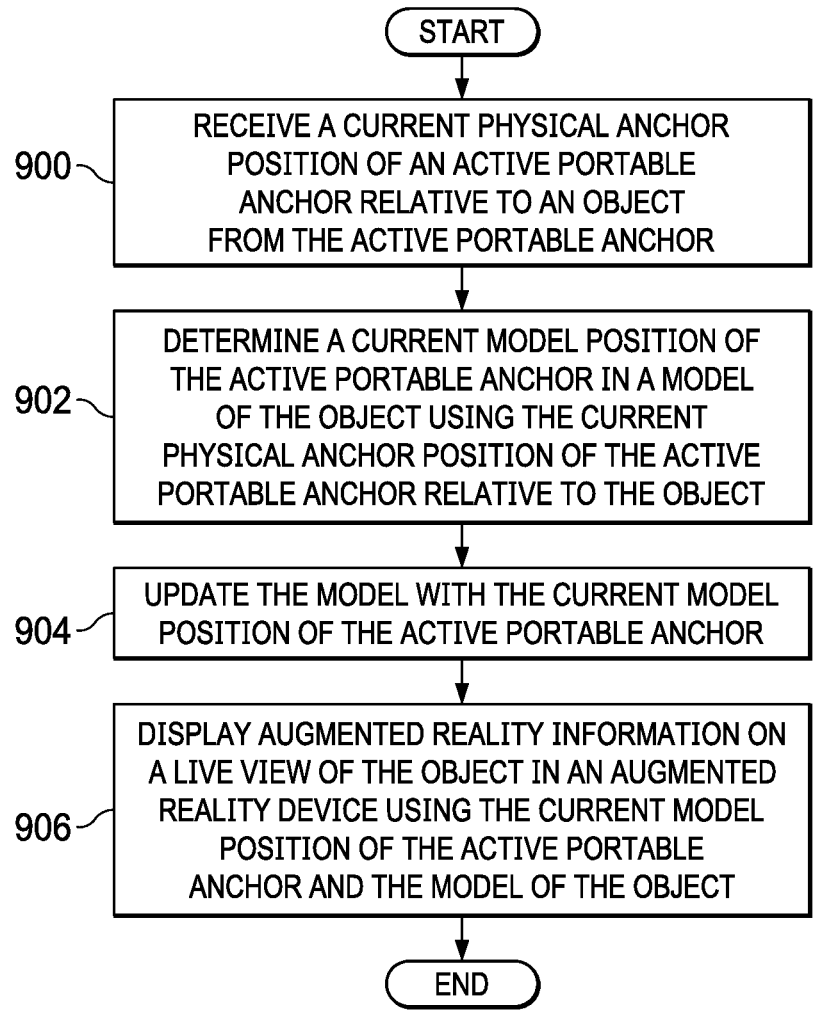
FIG. 9 is an illustration of a flowchart of a process for displaying augmented reality information in accordance with an illustrative embodiment.

The different processes in the flowcharts in FIGS. 7-9 can be implemented in hardware, software, or both. When implemented in software, the processes can take the form of program code that is run by one of more processor units located in one or more hardware devices in one or more computer systems.

With reference to FIG. 7, an illustration of a flowchart of a process for displaying augmented reality information on a live view is depicted in accordance with an illustrative embodiment. In this depicted example, the process in FIG. 7 can be implemented in one or more components in augmented reality system 202 in FIG. 2. For example, the different operations can be implemented by processor system 218, which contains processors that can be located in the different hardware components in augmented reality system 202 and augmented reality device 212 in FIG. 2.

The process begins by an external tracking system determining a physical anchor position of an active portable anchor and a physical object position of an object (operation 700). In this illustrative example, operation 700 can be performed by one or more processor units in external tracking system 216 in FIG. 2. These two positions, the physical anchor position and the physical object position, are in a tracking coordinate system for the external tracking system.

A processor system generates current position data (operation 702). The current position data contains the current physical anchor position of the active portable anchor relative to the object. This current physical anchor position can be identified by subtracting the physical object position from the physical anchor position. Operation 702 can be performed by one or more processor units in the processor system located in at least one of the external tracking system and the active portable anchor.

The active portable anchor outputs the current position data (operation 704). In the illustrative example, the output can be in a form selected from at least one of a wireless transmission or a visual display of the current position data.

The processor system updates a model of the object with the current position data operation 706). In operation 704, the process updates the model to reflect a current model anchor position for the active portable anchor relative to the object in the model.

In this example, one or more processor units in the processor system perform this operation and can be located in at least one of the augmented reality device or a computer that stores or sends the model of the object to the augmented reality device, or on some other data processing and the augmented reality system.

In operation 706, the position of the active physical anchor in the model of the object is updated to reflect the current position of the active portable anchor in the real-world environment.

An augmented reality device orients itself with the active portable anchor in a real-world environment (operation 708). The process terminates thereafter. In this illustrative example, the augmented reality device receives and uses the current physical anchor position output by the active portable anchor to correspond the model of the object on a live view of the object in the real-world environment. The augmented reality device displays augmented reality information with increased accuracy as compared to currently used.

With reference next to FIG. 8, an illustration of a flowchart of a process for outputting a current physical anchor position to orient an augmented reality device is depicted in accordance with an illustrative embodiment. The process depicted in this flowchart can be implemented in active portable anchor 214 in FIG. 2.

The process begins by identifying a current physical anchor position of an active portable anchor (operation 800). The active portable anchor is used by an augmented reality device to display augmented reality information on a live view of an object.

In one illustrative example, the identification performed in operation 800 comprises determining, by the active portable anchor, the current physical anchor position of the active portable anchor relative to the object using a physical anchor position of the active portable anchor and a physical object position of the object. In another example, the identifying step comprises determining, by the active portable anchor, the current model anchor position of the active portable anchor in the model of the object that correlates to the current physical anchor position of the active portable anchor relative to the object received from the active portable anchor. In still another illustrative example, the identifying step comprises determining, by an external tracker, the current physical anchor position of the active portable anchor relative to the object using a physical anchor position of the active portable anchor and a physical object position of the object.

The process outputs the current physical anchor position of the active portable anchor relative to an object (operation 802). The process terminates thereafter. This current physical anchor position can be dynamically updated when the active portable anchor is moved to maintain a desired distance from an augmented reality device.

Turning next to FIG. 9, an illustration of a flowchart of a process for displaying augmented reality information is depicted in accordance with an illustrative embodiment. The process in FIG. 9 can be implemented in augmented reality device 212 in FIG. 2.

The process begins by receiving a current physical anchor position of an active portable anchor relative to an object from the active portable anchor (operation 900). The process determines a current model position of the active portable anchor in a model of the object using the current physical anchor position of the active portable anchor relative to the object (operation 902). The process updates the model with the current model position of the active portable anchor (operation 904).

The process displays augmented reality information on a live view of the object in an augmented reality device using the current model position of the active portable anchor and the model of the object (operation 906). The process terminates thereafter.

Accuracy in positioning augmented reality information on a live view of the object is increased with dynamically updating the current position of the active portable anchor in the model of the object to reflect the current physical anchor position of the active portable anchor relative to the physical object position of the object.

Figure 10:
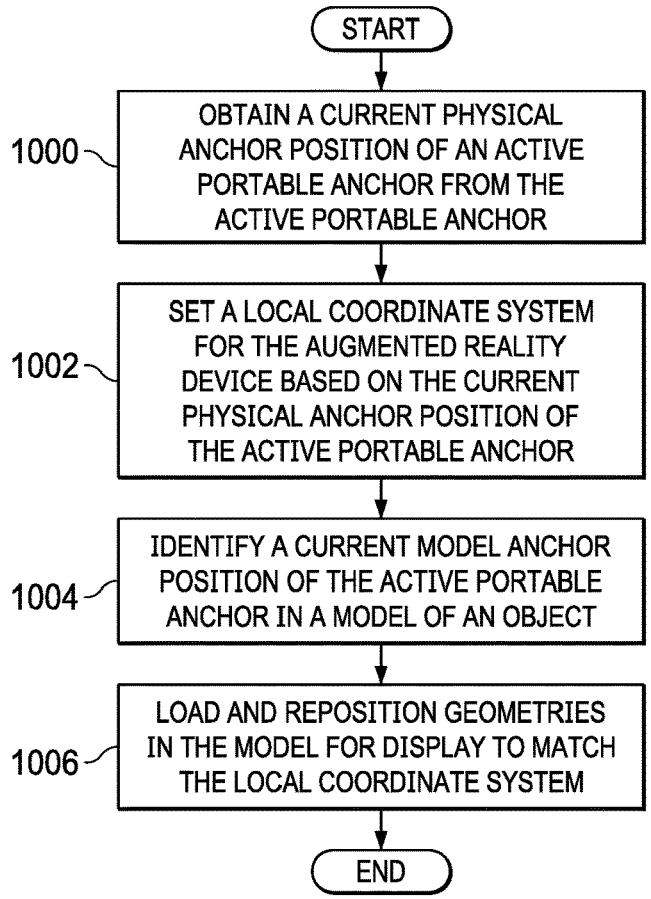
FIG. 10 is an illustration of a flowchart of a process for orienting an augmented reality device in accordance with an illustrative embodiment.

With reference next to FIG. 10, an illustration of a flowchart of a process for orienting an augmented reality device is depicted in accordance with an illustrative embodiment. The process in FIG. 10 can be implemented in one or more components in augmented reality system 202. For example, the different operations can be implemented by one or more processor units in augmented reality device 212 in FIG. 2.

The process begins by obtaining a current physical anchor position of an active portable anchor from the active portable anchor (operation 1000). In operation 1000, the current physical anchor position can be displayed on a display device on the active portable anchor. The current physical anchor position can be obtained by the augmented reality device from the display device. In another illustrative example, the current physical anchor position can be obtained by the augmented reality device from a wireless transmission received by the augmented reality device from the active portable anchor.

The process sets a local coordinate system for the augmented reality device based on the current physical anchor position of the active portable anchor (operation 1002). This position includes a location in three-dimensional space and an orientation.

The process identifies a current model anchor position of the active portable anchor in a model of an object (operation 1004). This current model anchor position is in the coordinate system used by the model. The process loads and repositions geometries in the model for display to match the local coordinate system (operation 1006). The process terminates thereafter. In operation 1006, the augmented reality device loads augmented reality information from the model for display on a live view of the object with the desired position on the live view.

Figure 11:
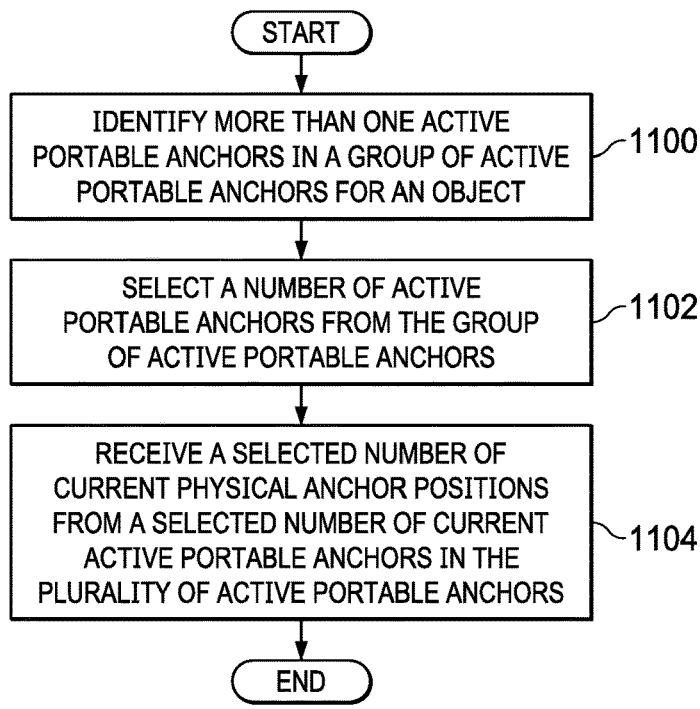
FIG. 11 is an illustration of a flowchart of a process for receiving a current physical anchor position in accordance with an illustrative embodiment.

With reference next to FIG. 11, an illustration of a flowchart of a process for receiving a current physical anchor position is depicted in accordance with an illustrative embodiment. The process in FIG. 11 can be implemented in augmented reality device 212 in FIG. 2.

The process begins by identifying more than one active portable anchors in a group of active portable anchors for an object (operation 1100). In this example, the group of active portable anchors is a plurality of active portable anchors for the object. The process selects a number of active portable anchors from the group of active portable anchors (operation 1102). As used herein, a "number of," when used with reference to items, means one or more items. For example, a number of active portable anchors is one or more active portable anchors.

The selection in operation 1102 can be made a number of different ways. For example, the selection of the closest active portable anchor can be based on the closest one in a field of view of an augmented reality device. In another example, more than one active portable anchors are used in a calibration and location is cross referenced using more than one anchor origin. A bias or heavier weighting can be given to the closer anchor.

The process receives a selected number of current physical anchor positions from a selected number of current active portable anchors in the plurality of active portable anchors (operation 1104). The process terminates thereafter. For example, the augmented reality device can receive a single current anchor position of the closest active portable anchor. In yet another illustrative example, the augmented reality device receives a selected plurality of current physical anchor positions from a plurality of current active portable anchors.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 12:
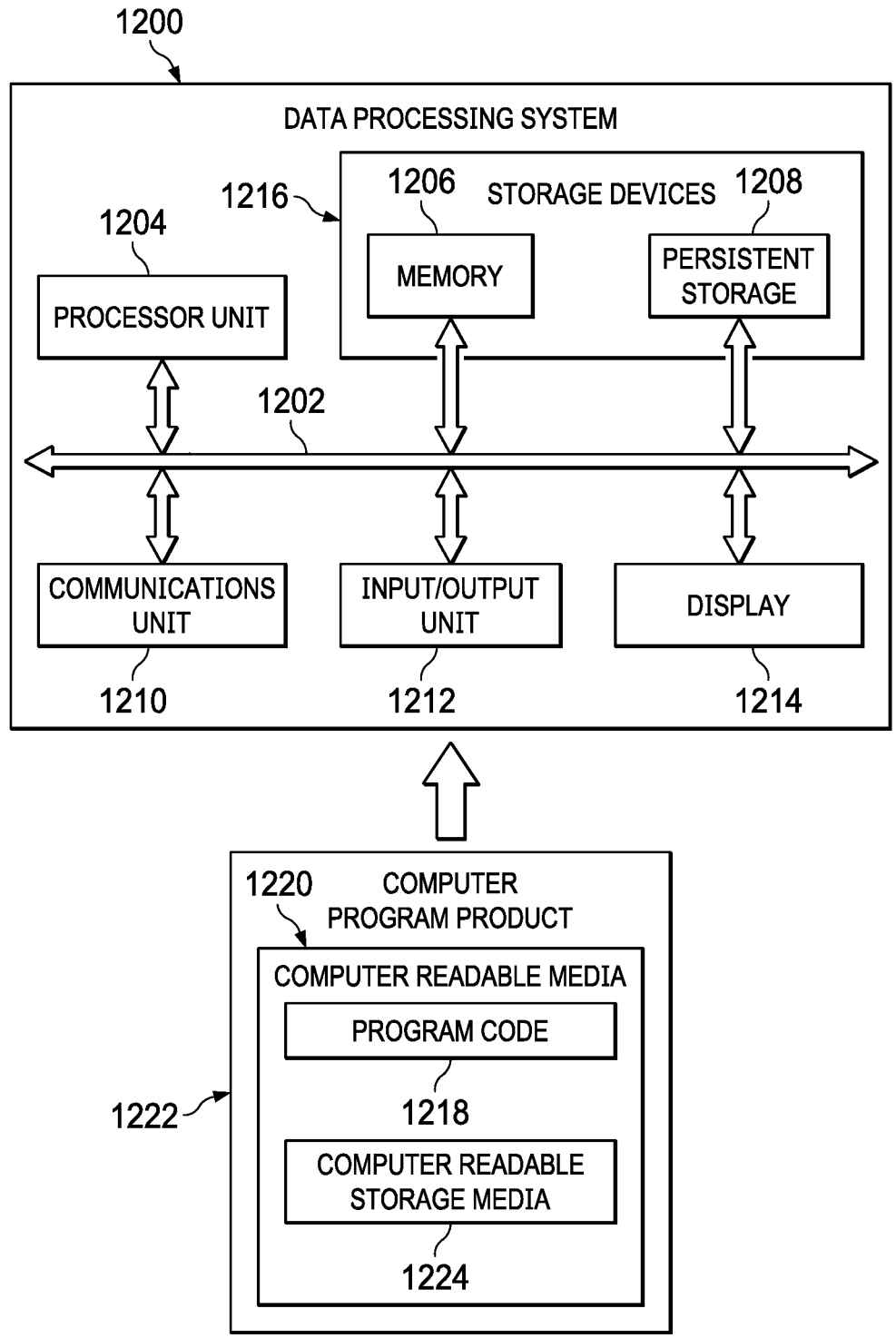
FIG. 12 is an illustration of a block diagram of a data processing system in accordance with an illustrative embodiment.

Turning now to FIG. 12, an illustration of a block diagram of a data processing system is depicted in accordance with an illustrative embodiment. Data processing system 1200 may be used to implement server computer 104, server computer 106, client devices 110, augmented reality device 212, active portable anchor 214, external tracking system 216, computer system 236, smart glasses 402, computer 405, active portable anchor 406, and any other data processing system that may be used to perform operations on the different illustrative examples. As depicted, data processing system 1200 includes communications framework 1202, which provides communications between processor unit 1204, memory 1206, persistent storage 1208, communications unit 1210, input/output (I/O) unit 1212, and display 1214. In this example, communications framework 1202 may take the form of a bus system.

Processor unit 1204 serves to execute instructions for software that may be loaded into memory 1206. Processor unit 1204 may be a number of processors, a multi-processor core, or some other type of processor, depending on the particular implementation.

Memory 1206 and persistent storage 1208 are examples of storage devices 1216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1216 may also be referred to as computer-readable storage devices in these illustrative examples. Memory 1206, in these examples, may be, for example, a random-access memory or any other suitable volatile or non-volatile storage device. Persistent storage 1208 may take various forms, depending on the particular implementation.

For example, persistent storage 1208 may contain one or more components or devices. For example, persistent storage 1208 may be a hard drive, a solid-state drive (SSD), a flash memory, a rewritable optical disk, a rewritable magnetic tape, or some combination of the above. The media used by persistent storage 1208 also may be removable. For example, a removable hard drive may be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that may be connected to data processing system 1200. For example, input/output unit 1212 may provide a connection for user input through at least one of a keyboard, a mouse, or some other suitable input device. Further, input/output unit 1212 may send output to a printer. Display 1214 provides a mechanism to display information to a user.

Instructions for at least one of the operating system, applications, or programs may be located in storage devices 1216, which are in communication with processor unit 1204 through communications framework 1202. The processes of the different embodiments may be performed by processor unit 1204 using computer-implemented instructions, which may be located in a memory, such as memory 1206.

These instructions are referred to as program code, computer usable program code, or computer-readable program code that may be read and executed by a processor in processor unit 1204. The program code in the different embodiments may be embodied on different physical or computer-readable storage media, such as memory 1206 or persistent storage 1208.

Program code 1218 is located in a functional form on computer-readable media 1220 that is selectively removable and may be loaded onto or transferred to data processing system 1200 for execution by processor unit 1204. Program code 1218 and computer-readable media 1220 form computer program product 1222 in these illustrative examples. In the illustrative example, computer-readable media 1220 is computer-readable storage media 1224.

In these illustrative examples, computer-readable storage media 1224 is a physical or tangible storage device used to store program code 1218 rather than a medium that propagates or transmits program code 1218.

Alternatively, program code 1218 may be transferred to data processing system 1200 using a computer-readable signal media. The computer-readable signal media may be, for example, a propagated data signal containing program code 1218. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1200 are not meant to provide architectural limitations to the manner in which different embodiments may be implemented. The different illustrative embodiments may be implemented in a data processing system including components in addition to or in place of those illustrated for data processing system 1200. Other components shown in FIG. 12 can be varied from the illustrative examples shown. The different embodiments may be implemented using any hardware device or system capable of running program code 1218.

Figure 13:
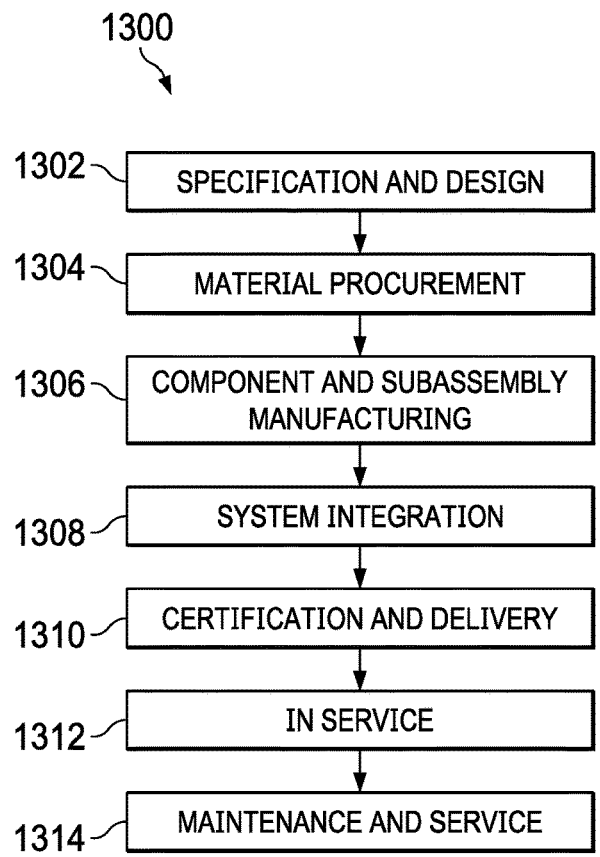
FIG. 13 is an illustration of a block diagram of an aircraft manufacturing and service method in accordance with an illustrative embodiment.
Figure 14:
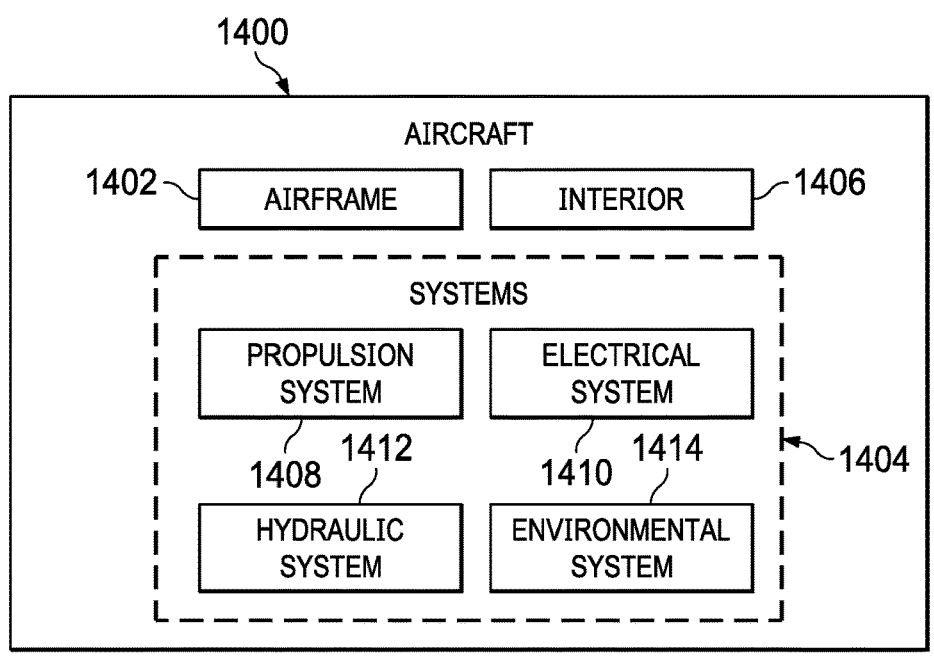
FIG. 14 is an illustration of a block diagram of an aircraft in which an illustrative embodiment may be implemented.

Illustrative embodiments of the disclosure may be described in the context of aircraft manufacturing and service method 1300 as shown in FIG. 13 and aircraft 1400 as shown in FIG. 14. Turning first to FIG. 13, an illustration of a block diagram of an aircraft manufacturing and service method is depicted in accordance with an illustrative embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 in FIG. 14 takes place. Thereafter, aircraft 1400 in FIG. 14 may go through certification and delivery 1310 in order to be placed in service 1312. While in service 1312 by a customer, aircraft 1400 in FIG. 14 is scheduled for routine maintenance and service 1314, which may include modification, reconfiguration, refurbishment, and other maintenance or service. For example, aircraft inspections during routine maintenance and service 1314 can include operations to maintain or increase at least one of safety of flight or availability of aircraft 1400 in FIG. 14.

Each of the processes of aircraft manufacturing and service method 1300 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of an aircraft is depicted in which an illustrative embodiment may be implemented. In this example, aircraft 1400 is produced by aircraft manufacturing and service method 1300 in FIG. 13 and may include airframe 1402 with plurality of systems 1404 and interior 1406. Examples of systems 1404 include one or more of propulsion system 1408, electrical system 1410, hydraulic system 1412, and environmental system

1414. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1300 in FIG. 13.

In one illustrative example, components or subassemblies produced in component and subassembly manufacturing 1306 in FIG. 13 may be fabricated or manufactured in a manner similar to components or subassemblies produced while aircraft 1400 is in service 1312 in FIG. 13. As yet another example, one or more apparatus embodiments, method embodiments, or a combination thereof may be utilized during production stages, such as component and subassembly manufacturing 1306 and system integration 1308 in FIG. 13. One or more apparatus embodiments, method embodiments, or a combination thereof may be utilized while aircraft 1400 is in service 1312, during maintenance and service 1314 in FIG. 13, or both. For example, augmented reality system 202 in FIG. 2 can be utilized during at least one of component and subassembly manufacturing 1306, system integration 1308, certification and delivery 1310, in service 1312, or maintenance and service 1314. With the use of active portable anchor 214, the display of augmented reality information on a live view to human operator may be performed in a manner that allows the human operator to move more freely and maintain a desired level of accuracy in displaying augmented reality information as compared to currently available techniques. A number of the different illustrative embodiments may substantially expedite the assembly of aircraft 1400, reduce the cost of aircraft 1400, or both expedite the assembly of aircraft 1400 and reduce the cost of aircraft 1400.

Figure 15:
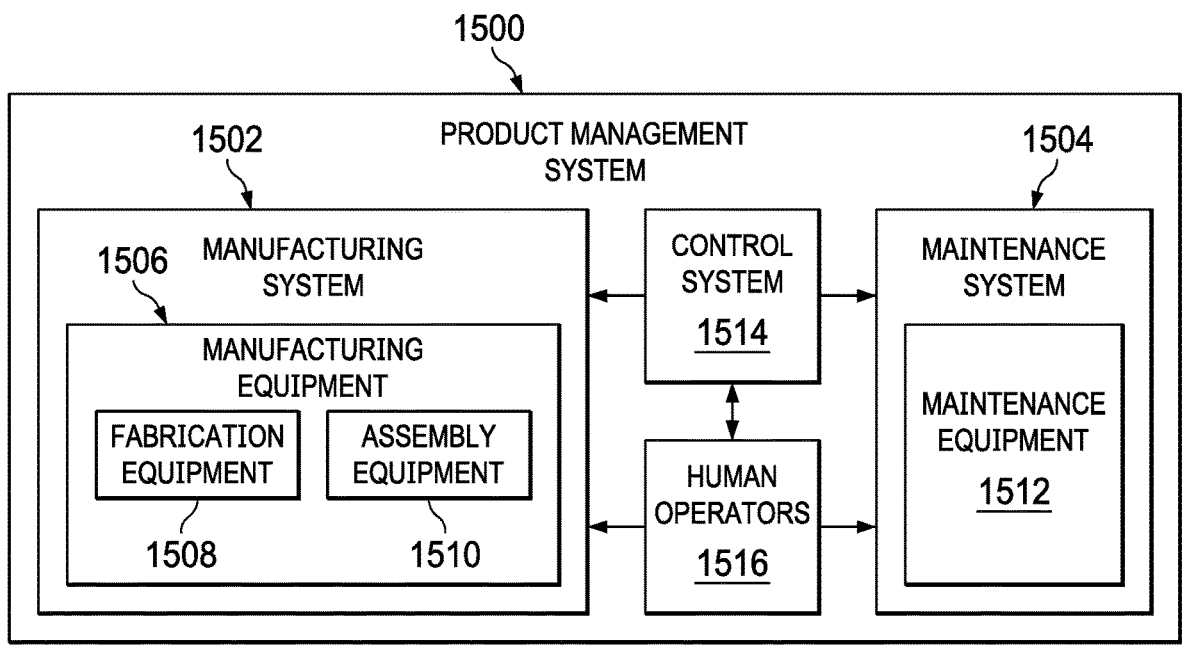
FIG. 15 is an illustration of a block diagram of a product management system in accordance with an illustrative embodiment.

Turning now to FIG. 15, an illustration of a block diagram of a product management system is depicted in accordance with an illustrative embodiment. Product management system 1500 is a physical hardware system. In this illustrative example, product management system 1500 may include at least one of manufacturing system 1502 or maintenance system 1504.

Manufacturing system 1502 is configured to manufacture products, such as aircraft 1400 in FIG. 14. As depicted, manufacturing system 1502 includes manufacturing equipment 1506. Manufacturing equipment 1506 includes at least one of fabrication equipment 1508 or assembly equipment 1510.

Fabrication equipment 1508 is equipment that may be used to fabricate components for parts used to form aircraft 1400 in FIG. 14. For example, fabrication equipment 1508 may include machines and tools. These machines and tools may be at least one of a drill, a hydraulic press, a furnace, a mold, a composite tape laying machine, a vacuum system, a lathe, or other suitable types of equipment. Fabrication equipment 1508 may be used to fabricate at least one of metal parts, composite parts, semiconductors, circuits, fasteners, ribs, skin panels, spars, antennas, or other suitable types of parts.

Assembly equipment 1510 is equipment used to assemble parts to form aircraft 1400 in FIG. 14. In particular, assembly equipment 1510 may be used to assemble components and parts to form aircraft 1400. Assembly equipment 1510 also may include machines and tools. These machines and tools may be at least one of a robotic arm, a crawler, a faster installation system, a rail-based drilling system, or a robot. Assembly equipment 1510 may be used to assemble parts such as seats, horizontal stabilizers, wings, engines, engine housings, landing gear systems, and other parts for aircraft 1400.

In this illustrative example, maintenance system 1504 includes maintenance equipment 1512. Maintenance equipment 1512 may include any equipment needed to perform maintenance on aircraft 1400 in FIG. 14. Maintenance equipment 1512 may include tools for performing different operations on parts on aircraft 1400. These operations may include at least one of disassembling parts, refurbishing parts, inspecting parts, reworking parts, manufacturing replacement parts, or other operations for performing maintenance on aircraft 1400. These operations may be for routine maintenance, inspections, upgrades, refurbishment, or other types of maintenance operations.

In the illustrative example, maintenance equipment 1512 may include ultrasonic inspection devices, x-ray imaging systems, vision systems, drills, crawlers, and other suitable devices. In some cases, maintenance equipment 1512 may include fabrication equipment 1508, assembly equipment 1510, or both to produce and assemble parts that may be needed for maintenance.

Product management system 1500 also includes control system 1514. Control system 1514 is a hardware system and may also include software or other types of components. Control system 1514 is configured to control the operation of at least one of manufacturing system 1502 or maintenance system 1504. In particular, control system 1514 may control the operation of at least one of fabrication equipment 1508, assembly equipment 1510, or maintenance equipment 1512.

The hardware in control system 1514 may include computers, circuits, networks, and other types of equipment. The control may take the form of direct control of manufacturing equipment 1506. For example, robots, computer-controlled machines, and other equipment may be controlled by control system 1514. In other illustrative examples, control system 1514 may manage operations performed by human operators 1516 in manufacturing or performing maintenance on aircraft 1400. For example, control system 1514 may assign tasks, provide instructions, display models, or perform other operations to manage operations performed by human operators 1516. In these illustrative examples, augmented reality system 202 in FIG. 2 may be implemented in control system 1514 to manage at least one of the manufacturing or maintenance of aircraft 1400 in FIG. 14.

For example, augmented reality system 202 in FIG. 2 operates to display augmented reality information to human operators performing at least one of manufacturing or maintenance of a product such as aircraft 1400 in FIG. 14. The augmented reality information may present instructions to perform at least one of manufacturing or maintenance operations. As another example, the augmented reality information may identify work orders or tasks to be performed at different locations on aircraft 1400. Further, the augmented reality information displayed may guide human operators to positions on aircraft 1400 where operations should be performed.

Further, augmented reality system 202 in FIG. 2 can also be used to receive input from human operators. For example, the human operators may record inconsistencies identified from visual inspections using augmented reality system 202.

In the different illustrative examples, human operators 1516 may operate or interact with at least one of manufacturing equipment 1506, maintenance equipment 1512, or control system 1514. This interaction may be performed to manufacture aircraft 1400 in FIG. 14.

Of course, product management system 1500 may be configured to manage other products other than aircraft 1400 in FIG. 14. Although product management system 1500 has been described with respect to manufacturing in the aerospace industry, product management system 1500 may be configured to manage products for other industries. For example, product management system 1500 can be configured to manufacture products for the automotive industry as well as any other suitable industries.

Thus, one or more illustrative examples utilize active portable anchors that are placed on or proximate an object. These active portable anchors enable augmented reality devices to quickly orient themselves to the object in a real-world environment. Further, the active portable anchors can be used as a calibration plate similar to current anchors. In other words, an augmented reality device can recognize that an anchor is present in the real-world environment and can use this anchor in orienting itself to display augmented reality information. The active portable anchor also provides an augmented reality device the current anchor position of the active portable anchor relative to the object.

In this manner, in one or more technical solutions, the augmented reality device can locate itself more efficiently through using the active portable anchor and more accurately display augmented reality information in positions with respect to the object. For example, graphical indicators for locations in which holes are to be formed in the object can be displayed as augmented reality information on a live view of the object in a manner that is more accurate than with currently available systems. The active portable anchor can be moved to another position with the active portable anchor being updated to send this new position to the augmented reality device.

As a result, the augmented reality system in the illustrative examples operates as a special purpose computer system in which an active portable anchor in the augmented reality system enables an augmented reality device to display augmented reality information on a live view of an object with increased accuracy. In particular, the active portable anchor is a physical component that transforms the augmented reality system into a special purpose computer system as compared to currently available general computer systems that do not have the active portable anchor.

The illustrative embodiments recognize and take into account that this type of solution can be implemented by utilizing a secondary location system in the form of an external tracking system. The illustrative embodiments recognize and take into account that the external tracking system operates to identify the location of the active portable anchors and relay that information through those active portable anchors, which in turn provide the information to augmented reality devices. Further, accuracy in positioning the augmented reality information on the live view of the object is increased with updating the current model anchor position of the active portable anchor in the model of the object to reflect a change in the current physical anchor position of the active portable anchor relative to the object from a movement of the active portable anchor.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus that comprises:
    an augmented reality device that comprises an active portable anchor that comprises an antenna and a display device connected to a plate connected to a frame configured to output a current physical anchor position of the active portable anchor relative to an object to a model of the object in a computer system;
    augmented reality information from the model for a portion of the object displayed on a live view of the portion of the object, such that the active portable anchor is configured to output the current physical anchor position of the active portable anchor relative to the object based upon a physical object position of the object, such that the portion of the object comprises a tangible feature in a field of view of the augmented reality device.

2. The apparatus of claim 1, wherein the active portable anchor is configured to:
    receive a physical anchor position of the active portable anchor and the physical object position of the object as determined by an external tracking system that comprises a number of positioning locators: located off of and away from the object and the active portable anchor, and such that the external tracking system is configured to scan a volume that encompasses the object and the active portable anchor; and
    determine the current physical anchor position of the active portable anchor relative to the object based on the physical anchor position of the active portable anchor and the physical object position of the object.

3. The apparatus of claim 2, wherein the active portable anchor comprises:
    a portable frame;
    a communications unit physically connected to the portable frame, wherein the communications unit is configured to receive the physical anchor position of the active portable anchor and the physical object position of the object as determined by the external tracking system;
    an output system physically connected to the portable frame; and
    a processor unit physically connected to the portable frame and in communication with the communications unit and the output system, wherein the processor unit is configured to determine the current physical anchor position of the active portable anchor relative to the physical object position of the object using the physical anchor position and the physical object position; and output the current physical anchor position of the active portable anchor relative to the physical object position of the object using the output system.

4. The apparatus of claim 2, wherein the external tracking system comprises a global positioning system.

5. The apparatus of claim 3, wherein the output system comprises a wireless transmitter and the active portable anchor is within 5 meters of the augmented reality device.

6. The apparatus of claim 4, wherein the external tracking system is selected from at least one of a laser tracker, a laser scanner, a camera, a displacement sensor, a measurement sensor, or a probe.

7. The apparatus of claim 1, further comprising the augmented reality device configured to:
receive the current physical anchor position of the active portable anchor relative to the object output by the active portable anchor; and
display the augmented reality information on the live view of the object using the current physical anchor position to place the augmented reality information on the live view of the object.

8. The apparatus of claim 7, wherein the active portable anchor has a shape that is recognized by the augmented reality device as an anchor for displaying the augmented reality information on the live view.

9. The apparatus of claim 7 further comprising:
a group of active portable anchors for the object, wherein the active portable anchor and the group of active portable anchors are a plurality of active portable anchors for the object, and wherein the augmented reality device receives a selected number of current physical anchor positions from a selected number of current active portable anchors in the plurality of active portable anchors.

10. The apparatus of claim 1, wherein the object is selected from a group comprising a mobile platform, a stationary platform, a land-based structure, an aquatic-based structure, a space-based structure, an aircraft, a commercial aircraft, a rotorcraft, a surface ship, a tank, a personnel carrier, a train, a spacecraft, a space station, a satellite, a submarine, an automobile, a power plant, a bridge, a dam, a house, a manufacturing facility, a building, a fuselage, an engine, a wing, a skin panel, a landing gear assembly, and a monument.

11. An augmented reality system that comprises:
an augmented reality device configured to receive a current physical anchor position of an active portable anchor relative to an object from the active portable anchor, such that the object comprises a tangible feature;
determine, using the current physical anchor position of the active portable anchor relative to the object, a current model anchor position of the active portable anchor in a model of the object in a computer system; and
display augmented reality information from the model for a portion of the object displayed on a live view of the object in the augmented reality device based upon the current model anchor position of the active portable anchor and the model of the object, such that an accuracy in a position of the augmented reality information from the model for the portion of the object displayed on the live view of the portion of the object increases based upon an update of the current model anchor position of the active portable anchor in the model of the object that reflects a change in the current physical anchor position of the active portable anchor relative to the object based upon a movement of the active portable anchor.

12. The augmented reality system of claim 11, wherein the model of the object is a partial model of the object that comprises the portion of the object, and a distance from the active portable anchor to the augmented reality device remains five meters or less.

13. The augmented reality system of claim 12, wherein the partial model of the object is selected from the portion of the object in a field of view of the augmented reality device and the portion of the object within a selected distance of the augmented reality device.

14. A method for displaying augmented reality information about a portion of an object on a live view of the portion of the object on an augmented reality device, the method comprising:
receiving, by the augmented reality device, a current physical anchor position of an active portable anchor relative to the portion of the object in the live view from the active portable anchor in a field of view of the augmented reality device, such that the object comprises a tangible feature;
determining, by the augmented reality device, a current model anchor position of the active portable anchor in a model of the object in a computer system via scanning a volume that encompasses the object and the active portable anchor and using the current physical anchor position of the active portable anchor relative to the object; and
displaying, by the augmented reality device, the augmented reality information on the live view of the object in the augmented reality device using the current model anchor position of the active portable anchor and the model of the object, wherein accuracy in positioning the augmented reality information on the live view of the object is increased with dynamically updating the current model anchor position of the active portable anchor in the model of the object to reflect the current physical anchor position of the active portable anchor relative to a physical object position of the object.

15. The method of claim 14, wherein the model of the object is a partial model of the object that comprises the portion of the object, and a distance from the active portable anchor to the augmented reality device remains five meters or less.

16. The method of claim 15, wherein the partial model of the object is selected from the portion of the object in the field of view of the augmented reality device and the portion of the object within a selected distance of the augmented reality device.

17. The method of claim 14 further comprising:
receiving, by the active portable anchor, a physical anchor position of the active portable anchor and the physical object position of the object as determined by an external tracking system;
determining, by the active portable anchor, the current physical anchor position of the active portable anchor relative to the physical object position of the object using the physical anchor position of the active portable anchor and the physical object position of the object; and outputting, by the active portable anchor, the current physical anchor position of the active portable anchor relative to the physical object position of the object to the augmented reality device.

18. The method of claim 14 further comprising:
receiving, by the active portable anchor, the current physical anchor position of the active portable anchor relative to the object.

19. The method of claim 14, wherein the current physical anchor position of the active portable anchor relative to the physical object position of the object is output to the augmented reality device by an output system selected from at least one of a wireless transmitter or a display device.

20. The method of claim 14, wherein the object is selected from a group comprising a mobile platform, a stationary platform, a land-based structure, an aquatic-based structure, a space-based structure, an aircraft, a commercial aircraft, a rotorcraft, a surface ship, a tank, a personnel carrier, a train, a spacecraft, a space station, a satellite, a submarine, an automobile, a power plant, a bridge, a dam, a house, a manufacturing facility, a building, a fuselage, an engine, a wing, a skin panel, a landing gear assembly, and a monument.

21. A method for orienting an augmented reality device relative to an object that comprises a tangible feature, the method comprising:
   identifying, using a tracking system comprising a number of positioning locators located off of and away from the object and an active portable anchor associated with the augmented reality device, a current physical anchor position of the active portable anchor;
   the augmented reality device using a position of the active portable anchor in a field of view of the augmented reality device for determining and displaying augmented reality information from a model of the object in a computer system on a live view of the object that shows a location of the augmented reality information in the model of the object; and
   outputting the current physical anchor position of the active portable anchor relative to the object and updating a current model anchor position relative to the model of the object in an augmented reality system.

22. The method of claim 21, further comprising determining, by the active portable anchor, the current physical anchor position of the active portable anchor relative to the object using a physical anchor position of the active portable anchor and a physical object position of the object.

23. The method of claim 21, further comprising determining, by the active portable anchor, the current model anchor position of the active portable anchor in the model of the object that correlates to the current physical anchor position of the active portable anchor relative to the object received from the active portable anchor.

24. The method of claim 21, further comprising determining, by an external tracker, the current physical anchor position of the active portable anchor relative to the object using a physical anchor position of the active portable anchor and a physical object position of the object.

* * * * *